US011096145B2

(12) United States Patent
Li et al.

(10) Patent No.: US 11,096,145 B2
(45) Date of Patent: Aug. 17, 2021

(54) PAGING METHOD AND BASE STATION (71) Applicant: DATANG MOBILE COMMUNICATIONS EQUIPMENT CO., LTD., Beijing (CN)

(72) Inventors: Qiang Li, Beijing (CN); Zhiyong Ren, Beijing (CN); Juanjuan Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 3 days.

(21) Appl. No.: 16/484,113

(22) PCT Filed: Feb. 6, 2018

(86) PCT No.: PCT/CN2018/075449
§ 371 (c)(1),
(2) Date: Aug. 7, 2019

(87) PCT Pub. No.: WO2018/145625
PCT Pub. Date: Aug. 16, 2018

(65) Prior Publication Data
US 2020/0029301 A1 Jan. 23, 2020

(30) Foreign Application Priority Data
Feb. 7, 2017 (CN) .......................... 201710067695.9

(51) Int. Cl.
*H04W 68/02* (2009.01)
*H04W 76/30* (2018.01)
(Continued)

(52) U.S. Cl.
CPC ........... *H04W 68/02* (2013.01); *H04W 4/029* (2018.02); *H04W 4/80* (2018.02); *H04W 8/08* (2013.01);
(Continued)

(58) Field of Classification Search
CPC ..... H04W 68/02; H04W 76/30; H04W 4/029; H04W 4/80; H04W 76/11; H04W 8/08; H04W 68/005
See application file for complete search history.

(56) References Cited

U.S. PATENT DOCUMENTS

2010/0178941 A1* 7/2010 Chun .................... H04L 1/1848
455/458
2014/0256319 A1 9/2014 Lee
(Continued)

FOREIGN PATENT DOCUMENTS

CN 103874201 A 6/2014
CN 105122914 A 12/2015
(Continued)

OTHER PUBLICATIONS

InterDigital, "Paging for NB-IoT", 3GPP TSG RAN WG1 NB-IoT Ad-Hoc Meeting, R1-161916, Sophia Antipolis, France, Mar. 22-24, 2016.
(Continued)

*Primary Examiner* — Duc C Ho
(74) *Attorney, Agent, or Firm* — Kilpatrick Townsend & Stockton, LLP (57) ABSTRACT

Disclosed in the present application are a paging method and a base station. In the technical solution of the present application, the base station receives a paging message sent by a MME, the paging message carrying auxiliary information, the auxiliary information being used for indicating a paging range and/or paging times, and the paging range comprising a cell and/or base station recommended to a target terminal of the paging message; and the base station sends the paging message according to the auxiliary information.

18 Claims, 4 Drawing Sheets

A base station receives a paging message transmitted by an MME, where the paging message carries assistance data indicating a paging scope and/or a number of times for paging, and the paging scope includes a cell and/or a base station recommended for a target terminal of the paging message — 201

The base station transmits the paging message according to the assistance data — 202

(51) Int. Cl.
  *H04W 4/029* (2018.01)
  *H04W 4/80* (2018.01)
  *H04W 76/11* (2018.01)
  *H04W 8/08* (2009.01)
  *H04W 68/00* (2009.01)

(52) U.S. Cl.
  CPC .......... *H04W 68/005* (2013.01); *H04W 76/11* (2018.02); *H04W 76/30* (2018.02)

(56) References Cited

U.S. PATENT DOCUMENTS

| | | | |
|---|---|---|---|
| 2018/0070331 A1* | 3/2018 | Byun | H04W 72/1273 |
| 2018/0234917 A1* | 8/2018 | Kim | H04W 52/0216 |
| 2019/0021069 A1* | 1/2019 | Chun | H04W 4/70 |
| 2019/0239191 A1* | 8/2019 | Zee | H04W 76/27 |
| 2020/0267800 A1* | 8/2020 | Kim | H04W 76/38 |

FOREIGN PATENT DOCUMENTS

| | | |
|---|---|---|
| CN | 105517011 A | 4/2016 |
| CN | 105828436 A | 8/2016 |
| CN | 106304137 A | 1/2017 |
| CN | 106304336 A | 1/2017 |
| WO | 2016168973 A1 | 10/2016 |

OTHER PUBLICATIONS

RAN3, "Introduction of Paging Optimisation and Paging for Coverage Enhancement capable UEs", 3GPP TSG-RAN WG2 Meeting #93, R2-162030, R3-160332, St. Julian's, Malta, Feb. 15-19, 2016.

Nokia Networks et al, "Paging Optimization and NBIOT", 3GPP TSG-RAN WG3 #91, R3-160392, St Julian's, Malta, Feb. 15-19, 2016.

Huawei et al, "Introduction of Paging Optimisation and Paging for Coverage Enhancement capable UEs", 3GPP TSG-RAN WG3 Meeting #91, R3-160437, St. Julian's, Malta, Feb. 15-19, 2016.

* cited by examiner

Fig. 1

--Prior Art--

PAGING METHOD AND BASE STATION

This application is a National Stage of International Application No. PCT/CN2018/075449, filed Feb. 6, 2018, which claims priority to Chinese Patent Application No. 201710067695.9, filed Feb. 7, 2017, both of which are hereby incorporated by reference in their entireties.

FIELD

The present invention relates to the field of wireless communications, and particularly to a paging method and a base station.

BACKGROUND

In a Narrow Band Internet of Things (NB-IoT), a Mobility Management Entity (MME) pages a terminal in a range of a list of Tracking Area Identities (TAIs), where a Tracking Area (TA) is identified using a Tracking Area Code (TAC) and may include one or more base stations and/or cells, and a TAI is a unique identifier of the TA. The TAI includes a Mobile Country Code (MCC), a Mobile Network Code (MNC), and a TAC, each cell is allocated with a TAC, there may be the same TAC of a plurality of cells, and there may be the same TAC of a plurality of cells served by different base stations.

As per the existing protocol, the MME initiating a paging process transmits a paging message to an evolved NodeB (eNB), and the eNB pages the terminal in tracking areas in the range of the list of TAIs.

SUMMARY

Embodiments of the invention provide a paging method and a base station.

In a first aspect, an embodiment of the invention provides a paging method including:

receiving, by a base station, a paging message transmitted by an MME, wherein the paging message carries assistance data indicating a paging scope and/or a number of times for paging, and the paging scope includes a cell and/or a base station recommended for a target terminal of the paging message; and transmitting, by the base station, the paging message according to the assistance data.

Optionally, the cell recommended for the target terminal of the paging message includes:

a first cell, which is a cell where the target terminal lastly releases its connection; or the first cell, and an intra-station adjacent cell and/or an inter-station adjacent cell to the first cell.

Optionally, the base station recommended for the target terminal of the paging message includes:

a first base station which is a base station with which the target terminal lastly releases its connection; or the first base station, and an adjacent base station to the first base station.

Optionally, the assistance data includes an identifier of the cell recommended for the target terminal of the paging message; and transmitting, by the base station, the paging message according to the assistance data includes:

determining, by the base station, such a recommended cell of the base station that is located in a tracking area indicated by a TAI transmitted by the MME, according to the TAI and the identifier of the cell recommended for the target terminal of the paging message, and transmitting the paging message in the determined recommended cell.

Optionally, the assistance data further includes an identifier of the base station recommended for the target terminal of the paging message; and transmitting, by the base station, the paging message according to the assistance data includes:

determining, by the base station, whether the base station is located in a tracking area indicated by a TAI transmitted by the MME, according to the TAI and the identifier of the base station recommended for the target terminal of the paging message, and if so, then transmitting the paging message.

Optionally, the assistance data further indicates whether to change the paging scope of the paging message when the paging message is retransmitted; and transmitting, by the base station, the paging message according to the assistance data includes:

if the assistance data indicates that the paging scope of the paging message is changed when the paging message is retransmitted, then transmitting, by the base station, the paging message in the first cell among recommended cells, and retransmitting the paging message in all the recommended cells upon a failure in paging; or if the assistance data indicates that the paging scope of the paging message is not changed when the paging message is retransmitted, then transmitting, by the base station, the paging message in the first cell, and retransmitting the paging message in the first cell upon a failure in paging.

Optionally, the assistance data indicates for each recommended cell a coverage enhancement level and a number of paging attempts corresponding to the cell, wherein the number of paging attempts is greater than or equal to 1; and the method further includes:

before the paging message is transmitted, determining whether the number of paging attempts carried in the assistance data is 1, and if so, then determine the number of times for transmitting the paging message in the cell as 1; otherwise, searching a mapping relationship table between a coverage enhancement level and a number of times for paging according to the coverage enhancement level and the number of paging attempts corresponding to the cell in which the paging message is transmitted, and determining the number of times for transmitting the paging message in the cell as a number of times for paging found as a result of the search.

Optionally, in the mapping relationship table, a coverage enhancement level includes at least one sub-level, each sub-level corresponds to one or more values of the number of times for paging, and in the more values of the number of times for paging, a succeeding value of the number of times for paging is no less than a preceding value of the number of times for paging; and for adjacent first and second sub-levels in an ascending level order, the number of values of the number of times for paging corresponding to the first sub-level is less than the number of values of the number of times for paging corresponding to the second sub-level; and searching the mapping relationship table between a coverage enhancement level and a number of times for paging according to the coverage enhancement level and the number of paging attempts corresponding to the cell in which the paging message is transmitted includes:

determining a sub-level of the coverage enhancement level according to the coverage enhancement level and a cell signal strength in the assistance data; and among values of the number of times for paging, corresponding to the determined sub-level, and sorted in an ascending order, moving rightward to the (N−1)-th value of the number of times for paging starting with the number of paging attempts carried in the assistance data, and determining the number of times for transmitting the paging message in the cell as the (N−1)-th value of the number of times for paging, wherein N is a value of the number of paging attempts carried in the assistance data; wherein if the (N−1)-th value of the number of times for paging is greater than a preconfigured maximum value of the number of times for paging, then the number of times for transmitting the paging message in the cell is determined as the preconfigured maximum value of the number of times for paging.

Optionally, before the base station receives the paging message transmitted by the MME, the method further includes:

releasing, by the base station, a connection of the target terminal in the first cell, determining the first cell, or the first cell, and the intra-station adjacent cell and/or the inter-station adjacent cell to the first cell as the cell recommended for the target terminal, and transmitting the identifier of the recommended cell to the MME; or releasing, by the base station, a connection of the target terminal with the base station, determining the base station, and an adjacent base station to the base station as the base station recommended for the target terminal, and transmitting the identifier of the recommended base station to the MME.

Optionally, the method is applicable to an NB-IoT.

In a second aspect, an embodiment of the invention provides a base station including:

a receiving module configured to receive a paging message transmitted by an MME, wherein the paging message carries assistance data indicating a paging scope and/or a number of times for paging, and the paging scope includes a cell and/or a base station recommended for a target terminal of the paging message; and a paging module configured to transmit the paging message according to the assistance data.

Optionally, the cell recommended for the target terminal of the paging message includes:

a first cell, which is a cell where the target terminal lastly releases its connection; or the first cell, and an intra-station adjacent cell and/or an inter-station adjacent cell to the first cell.

Optionally, the base station recommended for the target terminal of the paging message includes:

a first base station which is a base station with which the target terminal lastly releases its connection; or the first base station, and an adjacent base station to the first base station.

Optionally, the assistance data includes an identifier of the cell recommended for the target terminal of the paging message, and the paging module includes: a paging scope determining unit and a transmitting unit, wherein:

the paging scope determining unit is configured to determine such a recommended cell of the base station that is located in a tracking area indicated by a TAI transmitted by the MME, according to the TAI and the identifier of the cell recommended for the target terminal of the paging message, and to instruct the transmitting unit to transmit the paging message in the determined recommended cell.

Optionally, the assistance data further includes the identifier of the base station recommended for the target terminal of the paging message, and the paging module further includes: a paging scope determining unit and a transmitting unit, wherein:

the paging scope determining unit is configured to determine whether the base station is located in a tracking area indicated by a TAI transmitted by the MME, according to the TAI and the identifier of the base station recommended for the target terminal of the paging message, and if so, to instruct the transmitting unit to transmit the paging message.

Optionally, the assistance data further indicates whether to change the paging scope of the paging message when the paging message is retransmitted, and the paging module further includes:

a paging scope determining unit configured, in the case that the assistance data indicates that the paging scope of the paging message is changed when the paging message is retransmitted, to transmit the paging message in the first cell among recommended cells, and to retransmit the paging message in all the recommended cells upon a failure in paging; or in the case that the assistance data indicates that the paging scope of the paging message is not changed when the paging message is retransmitted, to transmit the paging message in the first cell, and to retransmit the paging message in the first cell upon a failure in paging.

Optionally, the assistance data indicates for each recommended cell a coverage enhancement level and a number of paging attempts corresponding to the cell, wherein the number of paging attempts is greater than or equal to 1, and the paging module further includes:

a paging number determining unit configured, before the paging message is transmitted, to determine whether the number of paging attempts carried in the assistance data is 1, and if so, to determine the number of times for transmitting the paging message in the cell as 1; otherwise, to search a mapping relationship table between a coverage enhancement level and a number of times for paging according to the coverage enhancement level and the number of paging attempts corresponding to the cell in which the paging message is transmitted, and to determine the number of times for transmitting the paging message in the cell as a number of times for paging found as a result of the search.

Optionally, in the mapping relationship table, a coverage enhancement level includes at least one sub-level, each sub-level corresponds to one or more values of the number of times for paging, and in the more values of the number of times for paging, a succeeding value of the number of times for paging is no less than a preceding value of the number of times for paging; and for adjacent first and second sub-levels in an ascending level order, the number of values of the number of times for paging corresponding to the first sub-level is less than the number of values of the number of times for paging corresponding to the second sub-level; and the paging number determining unit is further configured:

to determine a sub-level of the coverage enhancement level according to the coverage enhancement level and a cell signal strength in the assistance data; and among values of the number of times for paging, corresponding to the determined sub-level, and sorted in an ascending order, to move rightward to the (N−1)-th value of the number of times for paging starting with the number of paging attempts carried in the assistance data, and to determine the number of times for transmitting the paging message in the cell as the (N−1)-th value of the number of times for paging, wherein N is a value of the number of paging attempts carried in the assistance data, wherein if the (N−1)-th value of the number of times for paging is greater than a preconfigured maximum value of the number of times for paging, then the number of times for transmitting the paging message in the cell is determined as the preconfigured maximum value of the number of times for paging.

Optionally, the base station further includes:

a releasing module configured to release a connection of the target terminal in the first cell, to determine the first cell, or the first cell, and the intra-station adjacent cell and/or the inter-station adjacent cell to the first cell as the cell recommended for the target terminal, and to transmit the identifier of the recommended cell to the MME; or to release a connection of the target terminal with the base station, to determine the base station, and an adjacent base station to the base station as the base station recommended for the target terminal, and to transmit the identifier of the recommended base station to the MME.

Optionally, the base station is applicable to an NB-IoT.

In a third aspect, an embodiment of the invention provides a base station including a transceiver, and a processor and a memory connected with the transceiver, wherein the processor is configured to read and execute programs in the memory to perform the method according to any one of the solutions in the first aspect above; and the transceiver is configured to receive and transmit data under the control of the processor.

In a fourth aspect, an embodiment of the invention provides a computer readable storage medium storing executable program codes configured to perform the method according to any one of the solutions in the first aspect above.

In the technical solutions according to the embodiments of the invention, a base station receives a paging message transmitted by an MME, where the paging message carries assistance data indicating a paging scope and/or a number of times for paging, and the paging scope includes a cell or cells and/or a base station or base stations recommended for a target terminal of the paging message; and the base station transmits the paging message according to the assistance data. In the embodiments of the invention, if the assistance data indicates the paging scope, then the base station will transmit the paging message to the cell or cells and/or the base station or base stations recommended for the target terminal, indicated by the assistance data upon reception of the assistance data, indicating the paging scope, transmitted by the MME, thus lowering the granularity of the paging scope as compared with the prior art in which the paging scope is defined per TAI; if the assistance data indicates the number of times for paging, then the base station will adjust the number of times for paging according to the assistance data, thus improving the probability that the target terminal is paged; and if the assistance data indicates the paging scope and the number of times for paging, then the base station will transmit the paging message to the cell or cells and/or the base station or base stations recommended for the target terminal, and adjust the number of times for paging according to the assistance data, thus lowering the granularity of the paging scope as compared with the prior art in which the paging scope is defined per TAI, and also improving the probability that the target terminal is paged.

BRIEF DESCRIPTION OF THE DRAWINGS

In order to make the technical solutions according to the embodiments of the invention more apparent, the drawings to which reference is to be made in the description of the embodiments will be introduced below in brevity, and apparently the drawings to be described below are only some embodiments of the invention. Those ordinarily skilled in the art can further derive the other drawings from these drawings without any inventive effort.

DETAILED DESCRIPTION OF THE EMBODIMENTS

Figure 1:
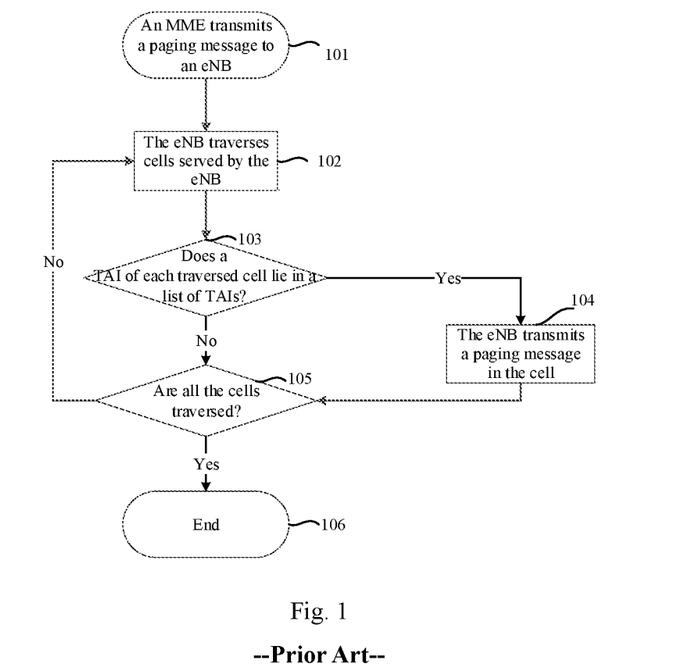
FIG. 1 is a schematic flow chart of a paging method in the prior art.

The embodiments of the invention are applicable to a paging service. FIG. 1 illustrates a schematic flow chart of a paging method in the prior art.

In the prior art, an MME initiating a paging process transmits a paging message to an eNB, and the eNB pages a target terminal in cells in all the tracking areas in a list of TAIs upon reception of the paging message. As illustrated in FIG. 1 which is a schematic flow chart of a paging method in the prior art, the flow includes the following operations.

In the operation 101, an MME transmits a paging message to an eNB, where the paging message includes a list of TAIs.

In the operation 102, the eNB traverses cells served by the eNB.

In the operation 103, the eNB determines whether a TAI of each traversed cell lies in the list of TAIs, and if so, then the eNB will proceed to the operation 104; otherwise, the eNB will proceed to the operation 105.

In the operation 104, the eNB transmits a paging message in the cell.

In the operation 105, the eNB determines whether all the cells are traversed, and if so, the eNB will proceed to the operation 106; otherwise, the eNB will proceed to the operation 102.

In the operation 106, the flow ends.

As can be apparent from the flow as illustrated in FIG. 1, in the prior art, a paging message is transmitted per TAI, there may be different base stations in a tracking area identified by a TAI, and there may be a plurality of cells served by different base stations, so a paging message may be transmitted in the plurality of cells served by the different base stations, thus resulting in a higher burden of processing signaling on the base stations, and a paging message of the same terminal may be transmitted in a plurality of cells, thus resulting in a waste of air interface resources. Furthermore, a paging message is transmitted only once, and the terminal may fail to be paged.

In order to address the problem above, the embodiments of the invention provide a paging method in which a paging scope and/or a number of times for paging is indicated using assistance data, where the indicated paging scope is smaller than the paging scope indicated in the list of TAIs in the prior art.

The embodiments of the invention can be applicable to a narrow band Internet of Things.

The embodiments of the invention will be described below in details with reference to the drawings.

Figure 2:
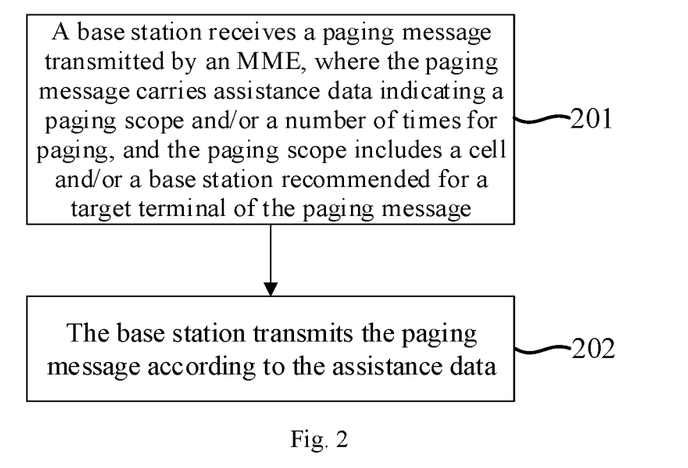
FIG. 2 is a schematic flow chart of a paging method according to an embodiment of the invention.

FIG. 2 illustrates a schematic flow chart of a paging method according to an embodiment of the invention, where the flow particularly includes the following operations.

In the operation 201, a base station receives a paging message transmitted by an MME, where the paging message carries assistance data indicating a paging scope and/or a number of times for paging.

In the operation 202, the base station transmits the paging message according to the assistance data.

In some embodiments of the invention, the paging scope indicated by the assistance data includes a cell recommended for a target terminal of the paging message (assistance data for a recommended cell or cells), where the cell recommended for the target terminal of the paging message includes at least a first cell, which is a cell where the target terminal lastly (i.e. most recently) releases its connection. Furthermore, if there is an intra-station adjacent cell to the first cell, then the intra-station adjacent cell is also deemed as a cell recommended for the target terminal. Furthermore, if there is an inter-station adjacent cell to the first cell, then the inter-station adjacent cell is also deemed as a cell recommended for the target terminal. The identifier(s) of the cell(s) recommended for the target terminal can be carried in the paging message transmitted by the MME as the assistance data. In a particular implementation, the identifiers of the recommended cells can be sorted in the order of the first cell, the intra-station adjacent cell, and the inter-station adjacent cell so that the base station identifies the types of the cells. The base station can transmit a paging message according to the identifier(s) of the cell(s) carried in the assistance data upon reception of the paging message transmitted by the MME. In a particular implementation, the base station can determine whether a TAI of a recommended cell of the base station lies in a list of TAIs transmitted by the MME, and if so, then the base station will transmit the paging message in the cell; otherwise, the base station will not transmit the paging message in the cell. Stated otherwise, the base station determines the recommended cell(s) of the base station, which is or are located in the tracking area(s) indicated by the TAIs transmitted by the MME, according to the TAIs and the identifier(s) of the cell(s) recommended for the target terminal of the paging message, and transmits the paging message in the determined recommended cell(s).

In some embodiments of the invention, the paging scope indicated by the assistance data includes a base station recommended for a target terminal (e.g. assistance data for recommended eNB), where the base station is a base station where the target terminal lastly releases its connection. Furthermore, if there is an inter-station adjacent cell to a cell where the target terminal is located when the target terminal lastly releases its connection, then a base station where the inter-station adjacent cell is located is also deemed as a base station recommended for the target terminal. Identifier(s) of the base station(s) recommended for the target terminal can be carried in the paging message transmitted by the MME as the assistance data. In a particular implementation, the identifiers of the recommended base stations can be sorted in the order of the base station where the target terminal is located when it lastly releases its connection, and the base station where the inter-station adjacent cell, to the cell where the target terminal is located when it lastly releases its connection, is located. The base station receiving the paging message transmitted by the MME can determine whether a recommended base station in the assistance data lies in a list of TAIs transmitted by the MME, and if so, then the base station will transmit the paging message; otherwise, the base station will not transmit the paging message.

In some embodiments of the invention, the paging scope indicated by the assistance data includes a cell and a base station recommended for a target terminal of the paging message, where the recommended cell and the recommended base station can be selected, the paging scope can be indicated by the assistance data, and the base station pages the target terminal according to the assistance data, as described in the embodiments above.

In some embodiments of the invention, the assistance data further carries information indicating whether to change the paging scope of the paging message when the paging message is retransmitted (next paging area scope), where the information will be referred to as a paging scope change flag for the sake of a convenient description, and the paging scope change flag can take different values to indicate whether to change the paging scope of the paging message when the paging message is retransmitted. By way of an example, if the value of the paging scope change flag is 0, then it will indicate that the paging scope is not changed when the paging message is retransmitted; and if the value thereof the paging scope change flag is 1, then it will indicate that the paging scope is changed when the paging message is retransmitted. In a particular implementation, if the value of the paging scope change flag in the assistance data indicates that the paging scope is changed when the paging message is retransmitted, then the base station will transmit the paging message in a first cell among the recommended cells, and retransmit the paging message in all the recommended cells upon a failure in paging; and if the value of the paging scope change flag in the assistance data indicates that the paging scope is not changed when the paging message is retransmitted, then the base station will transmit the paging message in the first cell among the recommended cells, and retransmit the paging message in the first cell upon a failure in paging, where optionally the first cell is a cell where the target terminal is located when it lastly releases its connection.

Figure 3:
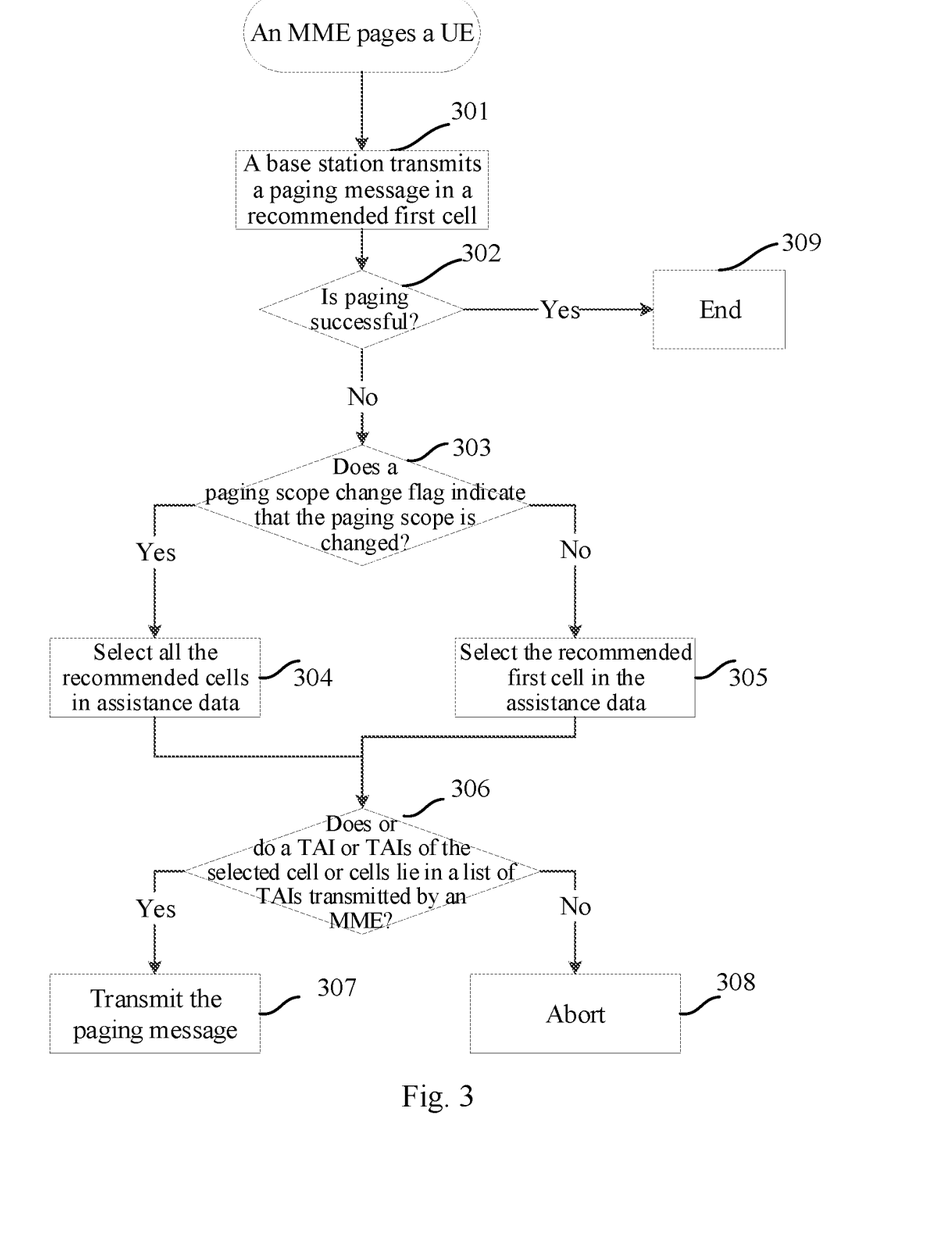
FIG. 3 is a schematic flow chart of a process of determining a paging scope according to an embodiment of the invention.

FIG. 3 illustrates a schematic flow chart of paging according to a paging scope change flag, where the flow particularly includes the following operations.

In the operation 301, a base station transmits a paging message in a recommended first cell.

In the operation 302, the base station determines whether paging is successful, and if not, then the base station will proceed to the operation 303; otherwise, the base station will proceed to the operation 309.

In the operation 303, the base station decides whether to change a paging scope of the paging message when the paging message is retransmitted, according to a value of a paging scope change flag, and if so, then the base station will proceed to the operation 304; otherwise, the base station will proceed to the operation 305.

In the operation 304, the base station selects all the recommended cells in assistance data, and proceeds to the operation 306.

In the operation 305, the base station selects the recommended first cell in the assistance data, and proceeds to the operation 306.

In the operation 306, the base station determines whether a TAI or TAIs of the cell or cells selected in the operation 304 or the operation 305 lies or lie in a list of TAIs transmitted by an MME, and if so, then the base station will proceed to the operation 307; otherwise, the base station will proceed to the operation 308.

In the operation 307, the base station transmits the paging message in the cell or cells.

In the operation 308, the base station aborts.

In the operation 309, the flow ends.

In some embodiments of the invention, the assistance data indicates for each recommended cell a coverage enhancement level (assistance data for coverage enhancement level capable UEs) and the number of paging attempts corresponding to the cell, where the number of paging attempts is greater than or equal to 1. The base station determines a number of times for paging according to a mapping relationship between a coverage enhancement level and a number of times for paging, and the number of paging attempts. In the mapping relationship between a coverage enhancement level and a number of times for paging, a coverage enhancement level includes at least one sub-level, each sub-level corresponds to one or more values of the number of times for paging, and in the more values of the number of times for paging, a succeeding value of the number of times for paging is no less than a preceding value of the number of times for paging; and if there are adjacent first and second sub-levels in an ascending level order, then the number of values of the number of times for paging corresponding to the first sub-level will be less than the number of values of the number of times for paging corresponding to the second sub-level. Table 1 depicts a mapping relationship between a coverage enhancement level and a number of times for paging by way of an example.

In a first implementation, if the assistance data indicates that the paging scope is changed when the paging message is retransmitted, then the number of times for paging will be a preset number of times for paging.

In a second implementation, if the assistance data does not carry any coverage enhancement level, then the number of times for paging will be a preset number of times for paging.

In a third implementation, if the identifier of the cell in which the paging message is transmitted is not included in the identifier(s) of the recommended cell(s) carried in the assistance data, then the number of times for paging will be a preset number of times for paging. By way of an example, if the base station fails in paging in a recommended cell, and the paging scope is further extended, then if the identifier of the cell in which the paging message is transmitted is not included in the identifier(s) of the recommended cell(s) carried in the assistance data, then the number of times for paging will be a preset number of times for paging.

In a fourth implementation, if the assistance data carries a coverage enhancement level and the number of paging attempts, then before the paging message is transmitted, the base station will determine whether the number of paging attempts carried in the assistance data is 1, and if so, then the base station will determine the number of times for transmitting the paging message in the cell as 1; otherwise, the base station will search the mapping relationship table between a coverage enhancement level and a number of times for paging according to the coverage enhancement

TABLE 1

Mapping relationship between a coverage enhancement level and a number of times for paging.

| | | | | | The number of times for paging | | | | | | | |
|---|---|---|---|---|---|---|---|---|---|---|---|---|
| Level 1 | 1 | 1 | | | | | | | | | | |
| | 2 | 1 | 2 | | | | | | | | | |
| | 3 | 1 | 2 | 4 | | | | | | | | |
| | 4 | 1 | 2 | 4 | 8 | | | | | | | |
| Level 2 | 5 | 1 | 2 | 4 | 8 | 16 | | | | | | |
| | 6 | 1 | 2 | 4 | 8 | 16 | 32 | | | | | |
| | 7 | 1 | 2 | 4 | 8 | 16 | 32 | 64 | | | | |
| | 8 | 1 | 2 | 4 | 8 | 16 | 32 | 64 | 128 | | | |
| Level 3 | 9 | 1 | 4 | 4 | 8 | 16 | 32 | 64 | 128 | 256 | | |
| | 10 | 1 | 4 | 4 | 16 | 16 | 32 | 64 | 128 | 256 | 512 | |
| | 11 | 1 | 8 | 8 | 8 | 32 | 32 | 64 | 128 | 256 | 512 | 1024 |
| | 12 | 1 | 8 | 8 | 8 | 64 | 64 | 64 | 128 | 256 | 512 | 1024 | 2048 |

Table 1 depicts a coverage enhancement level including four sub-levels (a coverage enhancement level corresponding to four rows) by way of an example, where the first row to the fourth row correspond to a coverage enhancement level 1, the fifth row to the eighth row correspond to a coverage enhancement level 2, and the ninth row to the twelfth row correspond to a coverage enhancement level 3, where the value of the number of times for paging corresponding to the first row is 1, the values of the number of times for paging corresponding to the second row are 1 and 2, the values of the number of times for paging corresponding to the third row are 1, 2, and 4, the values of the number of times for paging corresponding to the fourth row are 1, 2, 4, and 8, and the values of the number of times for paging corresponding to the other rows are as depicted in Table 1, although they will not be enumerated here.

In the assistance data, the number of times for paging is determined according to the coverage enhancement level and the number of paging attempts, indicated for each recommended cell, corresponding to the cells can be determined in one or more of the following implementations.

level and the number of paging attempts corresponding to the cell in which the paging message is transmitted, and determines the number of times for transmitting the paging message in the cell as a number of times for paging found as a result of the search. Where the base station determines a sub-level of the coverage enhancement level according to the coverage enhancement level and a cell signal strength in the assistance data; and among the values of the number of times for paging, corresponding to the determined sub-level, and sorted in an ascending order, the base station moves rightward to the (N−1)-th value of the number of times for paging starting with the number of paging attempts carried in the assistance data, and determines the number of times for transmitting the paging message in the cell as the (N−1)-th value of the number of times for paging, where N is the value of the number of paging attempts carried in the assistance data. Particularly, if the (N−1)-th value of the number of times for paging is greater than a preconfigured maximum value of the number of times for paging, then the base station will determine the number of times for transmitting the paging message in the cell as the preconfigured maximum value of the number of times for paging.

In the fourth implementation, for example, if the coverage enhancement level carried in the assistance data received by the base station is the coverage enhancement level 2, and the number of paging attempts carried in the assistance data is 2, then the base station will further determine the current coverage enhancement level as the sub-level 4 of the coverage enhancement level 2 according to the signal strength of the cell, and then search Table 1 according to the sub-level 4 of the coverage enhancement level 2, and locate the eighth row in Table 1; and since the value of the number of paging attempts in the assistance data is 2, the base station moves rightward to "4" by 2−1=1 times (i.e., the number of times of rightward equals to the number of paging attempts minus 1) starting with "2" in the eighth row in Table 1, and thus determines the number of times for transmitting the paging message in the cell as 4.

Figure 4:
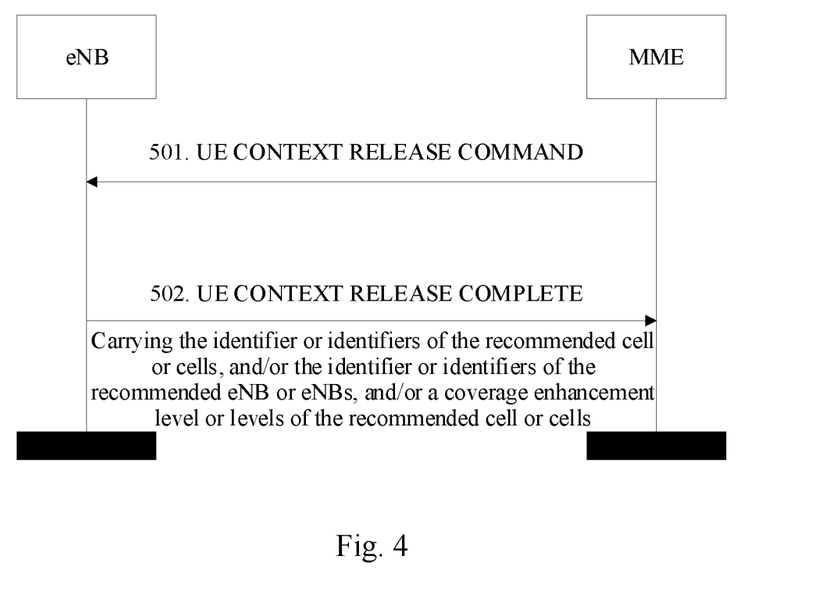
FIG. 4 is a schematic flow chart of a process of releasing a terminal according to an embodiment of the invention.

FIG. 4 illustrates a schematic flow chart of releasing a connection of a terminal according to an embodiment of the invention, where the flow includes the following operations.

In the operation 501, an MME transmits a UE Context Release command to a base station (e.g. an eNB).

In the operation 502, the base station returns a UE Context Release Complete message to the MME.

In this operation, in some embodiments of the invention, the base station releases a connection of a target terminal in a first cell, and determines the first cell as a cell recommended for the terminal. Furthermore, if there is an intra-station adjacent cell to the first cell, then the base station will also determine the intra-station adjacent cell to the first cell as a cell recommended for the terminal. Furthermore, if there is an inter-station adjacent cell to the first cell, then the base station will also determine the inter-station adjacent cell to the first cell as a cell recommended for the terminal. The base station carries the identifier or identifiers of the cell or cells recommended for the terminal in UE Context Release Complete message, and transmits it to the MME.

Optionally, the base station can further carry a coverage enhancement level or levels of the cell or cells recommended for the terminal in the UE Context Release Complete message, and return it to the MME for paging.

In this operation, in some embodiments of the invention, the base station releases a connection of the target terminal with the base station, and recommends the base station as a base station recommended for the target terminal. Furthermore, if there is an inter-station adjacent cell to a cell where the target terminal is located when it releases the connection, then the base station will also determine a base station where the inter-station adjacent cell is located as a base station recommended for the target terminal. The base station carries the identifier or identifiers of the recommended base station or base stations in the UE Context Release Complete message, and return it to the MME for paging.

In this operation, in some embodiments of the invention, the base station releases the connection of the target terminal in the first cell, determines the first cell, or the first cell, and an intra-station adjacent cell to the first cell and/or an inter-station adjacent cell to the first cell as a cell or cells recommended for the target terminal, and determines a base station where the first cell is located, or the base station, and a base station where the inter-station adjacent cell to the first cell is located as a base station or base stations recommended for the target terminal. The base station carries the identifier or identifiers of the cell or cells recommended for the terminal, and the identifier or identifiers of the base station or base stations recommended for the terminal in the UE Context Release Complete message, and return it to the MME for paging. Optionally, the base station can carry a coverage enhancement level or levels of the cell or cells recommended for the terminal in the UE Context Release Complete message, and transmit it to the MME.

Figure 5:
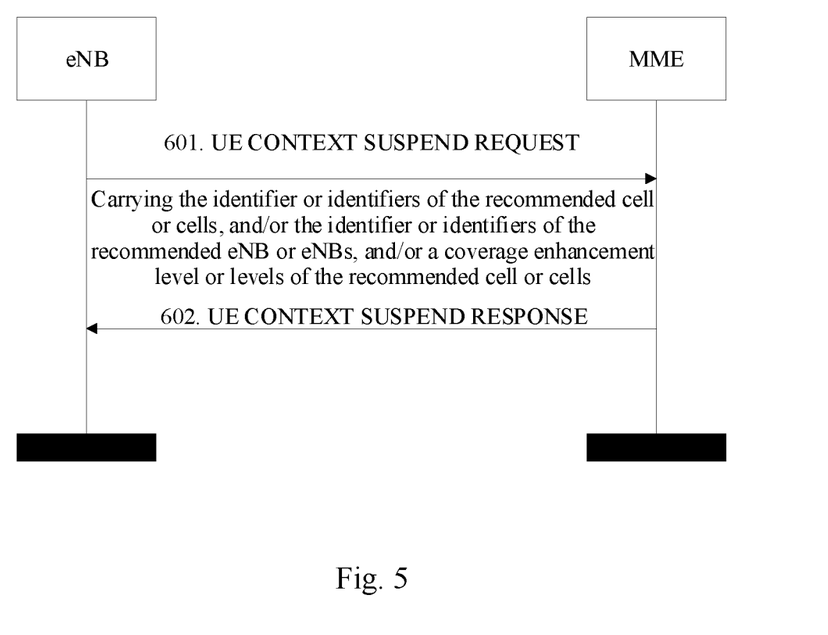
FIG. 5 is a schematic flow chart of a process of suspending a terminal according to an embodiment of the invention.

FIG. 5 illustrates a schematic flow chart of suspending a terminal according to an embodiment of the invention, where the flow includes the following operations.

In the operation 601, a base station (e.g. an eNB) transmits a UE Context Suspend Request message to an MME.

In this operation, in some embodiments, the base station releases a connection of a target terminal in a first cell, and determines the first cell as a cell recommended for the terminal. Furthermore, if there is an intra-station adjacent cell to the first cell, then the base station will also determine the intra-station adjacent cell to the first cell as a cell recommended for the terminal. Furthermore, if there is an inter-station adjacent cell to the first cell, then the base station will also determine the inter-station adjacent cell to the first cell as a cell recommended for the terminal. The base station carries the identifier or identifiers of the cell or cells recommended for the terminal in the UE Context Suspend Request message, and transmits it to the MME.

Optionally, the base station can further carry a coverage enhancement level or levels of the cell or cells recommended for the terminal in the UE Context Suspend Request message, and return it to the MME for paging.

In this operation, in some embodiments of the invention, the base station releases a connection of the target terminal with the base station, and recommends the base station as a base station recommended for the target terminal. Furthermore, if there is an inter-station adjacent cell to a cell where the target terminal is located when it releases the connection, then the base station will also determine a base station where the inter-station adjacent cell is located as a base station recommended for the target terminal. The base station carries the identifier or identifiers of the recommended base station or base stations in the UE Context Suspend Request message, and return it to the MME for paging.

In this operation, in some embodiments of the invention, the base station releases the connection of the target terminal in the first cell, determines the first cell, or the first cell, and an intra-station adjacent cell to the first cell, and/or an inter-station adjacent cell to the first cell as a cell or cells recommended for the target terminal, and determines a base station where the first cell is located, or the base station, and a base station where the inter-station adjacent cell to the first cell is located as a base station or base stations recommended for the target terminal. The base station carries the identifier or identifiers of the cell or cells recommended for the terminal, and the identifier or identifiers of the base station or base stations recommended for the terminal in the UE Context Suspend Request message, and return it to the MME for paging. Optionally, the base station can carry a coverage enhancement level or levels of the cell or cells recommended for the terminal in the UE Context Suspend Request message, and transmit it to the MME.

In the operation 602, the MME returns a UE Context Suspend Response message to the MME.

Figure 6:
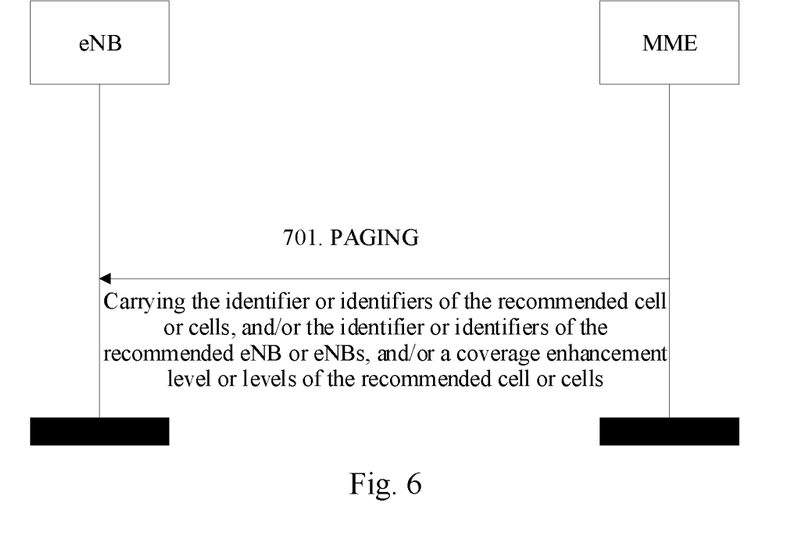
FIG. 6 is a schematic flow chart of a paging process according to an embodiment of the invention.

FIG. 6 illustrates a schematic flow chart of a paging process according to an embodiment of the invention, where the flow includes the following operations.

In the operation 701, an MME transmits a paging message to a base station (e.g. an eNB).

The paging message carries the identifier or identifiers of a recommended base station or base stations, and/or the identifier or identifiers of a recommended cell or cells, and/or a coverage enhancement level or levels of the recommended cell or cells, and information indicating whether to change a paging scope when the paging message is retransmitted, and the base station pages a target terminal upon reception of the paging message.

As can be apparent from the embodiments above, in the technical solutions according to the embodiments of the invention, a base station receives a paging message transmitted by an MME, where the paging message carries assistance data indicating a paging scope and/or a number of times for paging, and the paging scope includes a cell or cells and/or a base station or base stations recommended for a target terminal of the paging message; and the base station transmits the paging message according to the assistance data. In the embodiments of the invention, if the assistance data indicates the paging scope, then the base station will transmit the paging message to the cell or cells and/or the base station or base stations recommended for the target terminal, indicated by the assistance data upon reception of the assistance data, indicating the paging scope, transmitted by the MME, thus lowering a signaling burden at the base station side; if the assistance data indicates the number of times for paging, then the base station will adjust the number of times for paging according to the assistance data, thus improving the probability that the target terminal is paged; and if the assistance data indicates the paging scope and the number of times for paging, then the base station will transmit the paging message to the cell or cells and/or the base station or base stations recommended for the target terminal, and adjust the number of times for paging according to the assistance data, thus lowering a signaling burden at the base station side, but also improving the probability that the target terminal is paged.

Based upon the same technical idea, an embodiment of the invention further provides a base station.

Figure 7:
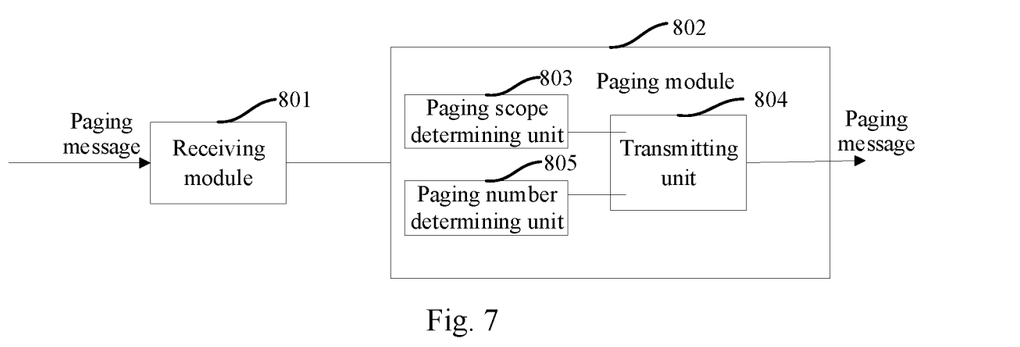
FIG. 7 is a schematic structural diagram of a base station according to an embodiment of the invention.

FIG. 7 illustrates a schematic structural diagram of a base station according to an embodiment of the invention. The base station can perform the flow as illustrated in the schematic diagram described in the embodiment above.

The base station according to the embodiment of the invention includes: a receiving module 801 and a paging module 802, where: the receiving module 801 is configured to receive a paging message transmitted by an MME, where the paging message carries assistance data indicating a paging scope and/or a number of times for paging, and the paging scope includes a cell or cells and/or a base station or base stations recommended for a target terminal of the paging message; and the paging module 802 is configured to transmit the paging message according to the assistance data.

Optionally, the cell or cells recommended for the target terminal of the paging message includes or include at least a first cell, which is a cell where the target terminal lastly releases its connection, or the first cell, and an intra-station adjacent cell and/or an inter-station adjacent cell to the first cell.

Optionally, the base station or base stations recommended for the target terminal of the paging message includes or include at least a first base station which is a base station with which the target terminal lastly releases its connection, or the first base station and an adjacent base station to the first base station.

Optionally, the assistance data includes the identifier or identifiers of the cell or cells recommended for the target terminal of the paging message, and the paging module 802 includes: a paging scope determining unit 803 and a transmitting unit 804, where the paging scope determining unit 803 is configured to determine such a recommended cell of the base station that is located in a tracking area indicated by a TAI transmitted by the MME, according to the TAI, and the identifier or identifiers of the cell or cells recommended for the target terminal of the paging message, and to instruct the transmitting unit 804 to transmit the paging message in the determined recommended cell.

Optionally, the assistance data further includes the identifier or identifiers of the base station or base stations recommended for the target terminal of the paging message, and the paging module 802 further includes: a paging scope determining unit 803 and a transmitting unit 804, where the paging scope determining unit 803 is configured to determine whether the base station is located in a tracking area indicated by a TAI transmitted by the MME, according to the TAI, and the identifier or identifiers of the base station or base stations recommended for the target terminal of the paging message, and if so, to instruct the transmitting unit 804 to transmit the paging message.

Optionally, the assistance data further indicates whether to change the paging scope of the paging message when the paging message is retransmitted, and the paging module 802 further includes: a paging scope determining unit 803 configured, in the case that the assistance data indicates that the paging scope of the paging message is changed when the paging message is retransmitted, to transmit the paging message in the first cell among the recommended cells, and to retransmit the paging message in all the recommended cells upon a failure in paging; or in the case that the assistance data indicates that the paging scope of the paging message is not changed when the paging message is retransmitted, to transmit the paging message in the first cell, and to retransmit the paging message in the first cell upon a failure in paging.

Optionally, the assistance data indicates for each recommended cell a coverage enhancement level and a number of paging attempts corresponding to the cell, where the number of paging attempts is greater than or equal to 1, and the paging module 802 further includes: a paging number determining unit 805 configured, before the paging message is transmitted, to determine whether the number of paging attempts carried in the assistance data is 1, and if so, to determine the number of times for transmitting the paging message in the cell as 1; otherwise, to search a mapping relationship table between a coverage enhancement level and a number of times for paging according to the coverage enhancement level and the number of paging attempts corresponding to the cell in which the paging message is transmitted, and to determine the number of times for transmitting the paging message in the cell as a number of times for paging found as a result of the search.

Optionally, in the mapping relationship table, a coverage enhancement level includes at least one sub-level, each sub-level corresponds to one or more values of the number of times for paging, and in the more values of the number of times for paging, a succeeding value of the number of times for paging is no less than a preceding value of the number of times for paging; and if there are adjacent first and second sub-levels in an ascending level order, then the number of values of the number of times for paging corresponding to the first sub-level is less than the number of values of the number of times for paging corresponding to the second sub-level. The paging number determining unit 805 is further configured: to determine a sub-level of the coverage enhancement level according to the coverage enhancement level and a cell signal strength in the assistance data; and among the values of the number of times for paging, corresponding to the determined sub-level, and sorted in an ascending order, to move rightward to the (N−1)-th value of the number of times for paging starting with the number of paging attempts carried in the assistance data, and to determine the number of times for transmitting the paging message in the cell as the (N−1)-th value of the number of times for paging, where N is the value of the number of paging attempts carried in the assistance data, where if the (N−1)-th value of the number of times for paging is greater than a preconfigured maximum value of the number of times for paging, then the number of times for transmitting the paging message in the cell will be determined as the preconfigured maximum value of the number of times for paging.

Optionally, the base station further includes: a releasing module (not illustrated) configured to release a connection of the target terminal in the first cell, to determine the first cell, or the first cell, and the intra-station adjacent cell and/or the inter-station adjacent cell to the first cell as the cell or cells recommended for the target terminal, and to transmit the identifier or identifiers of the recommended cell or cells to the MME; or to release a connection of the target terminal with the base station, to determine the base station, and an adjacent base station to the base station as the base station or base stations recommended for the target terminal, and to transmit the identifier or identifiers of the recommended base station or base stations to the MME.

Optionally, the base station is applicable to an NB-IoT.

Figure 8:
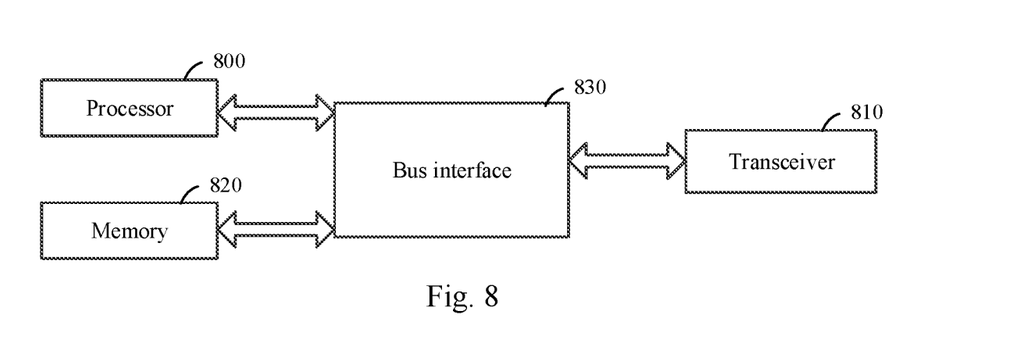
FIG. 8 is a schematic structural diagram of a base station according to another embodiment of the invention.

FIG. 8 illustrates a base station according to an embodiment of the invention, which can perform the method above, where the base station includes a transceiver 810, a processor 800 connected with the transceiver 810, and a memory 820.

Where, the processor 800 is configured to read and execute programs in the memory 820: to receive a paging message transmitted by an MME, where the paging message carries assistance data indicating a paging scope and/or a number of times for paging, and the paging scope includes a cell or cells and/or a base station or base stations recommended for a target terminal of the paging message; and to transmit the paging message according to the assistance data; and the transceiver 810 is configured to receive and transmit data under the control of the processor 800.

In FIG. 8, the bus architecture can include any number of interconnecting buses and bridges to particularly link together various circuits including one or more processors represented by the processor 800, and one or more memories represented by the memory 820. The bus architecture can further link together various other circuits, e.g., a peripheral device, a manostat, a power management circuit, etc., all of which are well known in the art, so a further description thereof will be omitted in this context. The bus interface 830 serves as an interface. The transceiver 810 can be an element, or a number of elements, e.g., a transmitter and a receiver, which are units for communication with various other devices over a transmission medium. The processor 800 is responsible for managing the bus architecture and performing normal processes, and can further provide various functions including timing, a peripheral interface, voltage regulation, power management, and other control functions, and the memory 820 can store data for use by the processor 800 in performing the operations.

Optionally, the processor 800 can be a Central Processing Unit (CPU), an Application-Specific Integrated Circuit (ASIC), a Field-Programmable Gate Array (FPGA), or a Complex Programmable Logic Device (CPLD).

In the embodiment of the invention, the processor 800 reads and executes the programs in the memory 820 to perform the methods according to the embodiments as illustrated in FIG. 2 to FIG. 6, and reference can be made to the description of the embodiments above for details thereof, so a repeated description thereof will be omitted here.

An embodiment of the invention further provides a computer readable storage medium storing executable program codes configured to perform the methods according to the embodiments above.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore, the appended claims are intended to be construed as encompassing the embodiments and all the modifications and variations coming into the scope of the invention.

Evidently those skilled in the art can make various modifications and variations to the invention without departing from the spirit and scope of the invention. Thus, the invention is also intended to encompass these modifications and variations thereto so long as the modifications and variations come into the scope of the claims appended to the invention and their equivalents.

The invention claimed is:

1. A paging method, comprising:
receiving, by a base station, a paging message transmitted by a Mobility Management Entity (MME), wherein the paging message carries assistance data indicating a paging scope and/or a number of times for paging, and the paging scope comprises a cell and/or a base station recommended for a target terminal of the paging message; and transmitting, by the base station, the paging message according to the assistance data;

wherein the assistance data indicates for each recommended cell a coverage enhancement level and a number of paging attempts corresponding to the cell, wherein the number of paging attempts is greater than or equal to 1; and the method further comprises:

before the paging message is transmitted, determining whether the number of paging attempts carried in the assistance data is 1, and if so, then determine a number of times for transmitting the paging message in the cell as 1; otherwise, searching a mapping relationship table between a coverage enhancement level and a number of times for paging according to the coverage enhancement level and the number of paging attempts corresponding to the cell in which the paging message is transmitted, and determining the number of times for transmitting the paging message in the cell as a number of times for paging found as a result of the search.

2. The method according to claim 1, wherein the cell recommended for the target terminal of the paging message comprises:

a first cell, which is a cell where the target terminal lastly releases its connection; or the first cell, and an intra-station adjacent cell and/or an inter-station adjacent cell to the first cell.

3. The method according to claim 1, wherein the base station recommended for the target terminal of the paging message comprises:

a first base station which is a base station with which the target terminal lastly releases its connection; or the first base station, and an adjacent base station to the first base station.

4. The method according to claim 1, wherein the assistance data comprises an identifier of the cell recommended for the target terminal of the paging message; and transmitting, by the base station, the paging message according to the assistance data comprises:

determining, by the base station, such a recommended cell of the base station that is located in a tracking area indicated by a Tracking Area Identity (TAI) transmitted by the MME, according to the TAI and the identifier of the cell recommended for the target terminal of the paging message, and transmitting the paging message in the determined recommended cell.

5. The method according to claim 1, wherein the assistance data further comprises an identifier of the base station recommended for the target terminal of the paging message; and transmitting, by the base station, the paging message according to the assistance data comprises:

determining, by the base station, whether the base station is located in a tracking area indicated by a Tracking Area Identity (TAI) transmitted by the MME, according to the TAI and the identifier of the base station recommended for the target terminal of the paging message, and if so, then transmitting the paging message.

6. The method according to claim 1, wherein the assistance data further indicates whether to change the paging scope of the paging message when the paging message is retransmitted; and transmitting, by the base station, the paging message according to the assistance data comprises:

if the assistance data indicates that the paging scope of the paging message is changed when the paging message is retransmitted, then transmitting, by the base station, the paging message in a first cell among recommended cells, and retransmitting the paging message in all the recommended cells upon a failure in paging; or if the assistance data indicates that the paging scope of the paging message is not changed when the paging message is retransmitted, then transmitting, by the base station, the paging message in the first cell, and retransmitting the paging message in the first cell upon a failure in paging.

7. The method according to claim 1, wherein in the mapping relationship table, a coverage enhancement level comprises at least one sub-level, each sub-level corresponds to one or more values of the number of times for paging, and in the more values of the number of times for paging, a succeeding value of the number of times for paging is no less than a preceding value of the number of times for paging; and for adjacent first and second sub-levels in an ascending level order, a number of values of the number of times for paging corresponding to the first sub-level is less than a number of values of the number of times for paging corresponding to the second sub-level; and searching the mapping relationship table between a coverage enhancement level and a number of times for paging according to the coverage enhancement level and the number of paging attempts corresponding to the cell in which the paging message is transmitted comprises:

determining a sub-level of the coverage enhancement level according to the coverage enhancement level and a cell signal strength in the assistance data; and among values of the number of times for paging, corresponding to the determined sub-level, and sorted in an ascending order, moving rightward to an $(N-1)$-th value of the number of times for paging starting with the number of paging attempts carried in the assistance data, and determining the number of times for transmitting the paging message in the cell as the $(N-1)$-th value of the number of times for paging, wherein N is a value of the number of paging attempts carried in the assistance data, wherein if the $(N-1)$-th value of the number of times for paging is greater than a preconfigured maximum value of the number of times for paging, then the number of times for transmitting the paging message in the cell is determined as the preconfigured maximum value of the number of times for paging.

8. The method according to claim 1, wherein before the base station receives the paging message transmitted by the MME, the method further comprises:

releasing, by the base station, a connection of the target terminal in a first cell, determining the first cell, or the first cell, and an intra-station adjacent cell and/or an inter-station adjacent cell to the first cell as the cell recommended for the target terminal, and transmitting an identifier of the recommended cell to the MME; or releasing, by the base station, a connection of the target terminal with the base station, determining the base station, and an adjacent base station to the base station as the base station recommended for the target terminal, and transmitting an identifier of the recommended base station to the MME.

9. The method according to claim 1, wherein the method is applicable to a Narrow Band Internet of Things (NB-IoT).

10. A base station, comprising at least one processor and a memory; wherein the memory is configured to store readable program codes, and the at least one processor is configured to execute the readable program codes to:

receive a paging message transmitted by a Mobility Management Entity (MME), wherein the paging message carries assistance data indicating a paging scope and/or a number of times for paging, and the paging scope comprises a cell and/or a base station recommended for a target terminal of the paging message; and transmit the paging message according to the assistance data;

wherein the assistance data indicates for each recommended cell a coverage enhancement level and a number of paging attempts corresponding to the cell, wherein the number of paging attempts is greater than or equal to 1, and the at least one processor is further configured to execute the readable program codes to:

determine, before the paging message is transmitted, whether the number of paging attempts carried in the assistance data is 1, and if so, determine a number of times for transmitting the paging message in the cell as 1; otherwise, search a mapping relationship table between a coverage enhancement level and a number of times for paging according to the coverage enhancement level and the number of paging attempts corresponding to the cell in which the paging message is transmitted, and determine the number of times for transmitting the paging message in the cell as a number of times for paging found as a result of the search.

11. The base station according to claim 10, wherein the cell recommended for the target terminal of the paging message comprises:
a first cell, which is a cell where the target terminal lastly releases its connection; or
the first cell, and an intra-station adjacent cell and/or an inter-station adjacent cell to the first cell.

12. The base station according to claim 10, wherein the base station recommended for the target terminal of the paging message comprises:
a first base station which is a base station with which the target terminal lastly releases its connection; or
the first base station, and an adjacent base station to the first base station.

13. The base station according to claim 10, wherein the assistance data comprises an identifier of the cell recommended for the target terminal of the paging message, and the at least one processor is further configured to execute the readable program codes to:
determine such a recommended cell of the base station that is located in a tracking area indicated by a Tracking Area Identity (TAI) transmitted by the MME, according to the TAI and the identifier of the cell recommended for the target terminal of the paging message, and instruct the transmitting unit to transmit the paging message in the determined recommended cell.

14. The base station according to claim 10, wherein the assistance data further comprises an identifier of the base station recommended for the target terminal of the paging message, and the at least one processor is further configured to execute the readable program codes to:
determine whether the base station is located in a tracking area indicated by a Tracking Area Identity (TAI) transmitted by the MME, according to the TAI and the identifier of the base station recommended for the target terminal of the paging message, and if so, instruct the transmitting unit to transmit the paging message.

15. The base station according to claim 10, wherein the assistance data further indicates whether to change the paging scope of the paging message when the paging message is retransmitted, and the at least one processor is further configured to execute the readable program codes to:
transmit, in a case that the assistance data indicates that the paging scope of the paging message is changed when the paging message is retransmitted, the paging message in a first cell among recommended cells, and retransmit the paging message in all the recommended cells upon a failure in paging; or
transmit, in a case that the assistance data indicates that the paging scope of the paging message is not changed when the paging message is retransmitted, the paging message in the first cell, and retransmit the paging message in the first cell upon a failure in paging.

16. The base station according to claim 10, wherein in the mapping relationship table, a coverage enhancement level comprises at least one sub-level, each sub-level corresponds to one or more values of the number of times for paging, and in the more values of the number of times for paging, a succeeding value of the number of times for paging is no less than a preceding value of the number of times for paging; and for adjacent first and second sub-levels in an ascending level order, a number of values of the number of times for paging corresponding to the first sub-level is less than a number of values of the number of times for paging corresponding to the second sub-level; and
the at least one processor is further configured to execute the readable program codes to:
determine a sub-level of the coverage enhancement level according to the coverage enhancement level and a cell signal strength in the assistance data; and
move, among values of the number of times for paging, corresponding to the determined sub-level, and sorted in an ascending order, rightward to an (N−1)-th value of the number of times for paging starting with the number of paging attempts carried in the assistance data, and determine the number of times for transmitting the paging message in the cell as the (N−1)-th value of the number of times for paging, wherein N is a value of the number of paging attempts carried in the assistance data, wherein if the (N−1)-th value of the number of times for paging is greater than a preconfigured maximum value of the number of times for paging, then the number of times for transmitting the paging message in the cell is determined as the preconfigured maximum value of the number of times for paging.

17. The base station according to claim 10, wherein the at least one processor is further configured to execute the readable program codes to:
release a connection of the target terminal in a first cell, determine the first cell, or the first cell, and an intra-station adjacent cell and/or an inter-station adjacent cell to the first cell as the cell recommended for the target terminal, and transmit an identifier of the recommended cell to the MME; or
release a connection of the target terminal with the base station, determine the base station, and an adjacent base station to the base station as the base station recommended for the target terminal, and transmit an identifier of the recommended base station to the MME.

18. A non-transitory computer readable storage medium, storing computer executable instructions configured to cause a computer to perform the method according to claim 1.

* * * * *